(12) United States Patent
Ozaki et al.

(10) Patent No.: US 9,007,234 B2
(45) Date of Patent: Apr. 14, 2015

(54) IN-VEHICLE DISPLAY APPARATUS AND DISPLAY METHOD

(75) Inventors: Yukisuke Ozaki, Kobe (JP); Takayoshi Yamashita, Kobe (JP)

(73) Assignee: Fujitsu Ten Limited, Kobe-shi (JP)

(*) Notice: Subject to any disclaimer, the term of this patent is extended or adjusted under 35 U.S.C. 154(b) by 77 days.

(21) Appl. No.: 13/116,728

(22) Filed: May 26, 2011

(65) Prior Publication Data

US 2011/0291860 A1    Dec. 1, 2011

(30) Foreign Application Priority Data

May 28, 2010 (JP) ................................. 2010-123593

(51) Int. Cl.
  *G08G 1/0962* (2006.01)
  *G01C 21/36* (2006.01)
  *G08G 1/0967* (2006.01)

(52) U.S. Cl.
  CPC .......... *G08G 1/0962* (2013.01); *G01C 21/3694* (2013.01); *G01C 21/3697* (2013.01); *G08G 1/096716* (2013.01); *G08G 1/09675* (2013.01); *G08G 1/096775* (2013.01); *G08G 1/096791* (2013.01)

(58) Field of Classification Search
  CPC ............... G01C 21/00–21/26; G01C 21/3691; G01C 21/28; G01C 21/34–21/3697; G06Q 30/02; G08G 1/096716; G08G 1/0962–1/096791
  USPC ............................ 340/988–996; 701/400–541
  See application file for complete search history.

(56) References Cited

U.S. PATENT DOCUMENTS

| | | | |
|---|---|---|---|
| 7,606,580 B2 * | 10/2009 | Granito et al. | ............. 455/456.1 |
| 2005/0221876 A1 | 10/2005 | Van Bosch et al. | |
| 2006/0142941 A1 * | 6/2006 | Imai et al. | ..................... 701/211 |

(Continued)

FOREIGN PATENT DOCUMENTS

| | | |
|---|---|---|
| JP | A-2004-46586 | 2/2004 |
| JP | A-2004-286447 | 10/2004 |

(Continued)

OTHER PUBLICATIONS

Jan. 7, 2014 Office Action issued in Japanese Patent Application No. 2010-123593 (with English Translation).

(Continued)

*Primary Examiner* — Hai Phan
*Assistant Examiner* — Orlando Bousono
(74) *Attorney, Agent, or Firm* — Oliff PLC

(57) ABSTRACT

An in-vehicle display apparatus includes a communication device and an in-vehicle device. The communication device acquires posted information and geographical location data indicating the destination of the posted information. Then, the communication device generates map data in which the posted information is displayed at a position specified by the geographical location data which is acquired together with the posted information. In addition, the communication device changes a method of displaying the posted information on the generated map data on the basis of the time elapsed from the posting of the information to the acquisition of the posted information and the category of the posted information. Then, the communication device transmits the map data in which the display method of the posted information is changed to the in-vehicle device. The in-vehicle device displays the received map data on, for example, a liquid crystal monitor.

7 Claims, 11 Drawing Sheets

(56) References Cited

U.S. PATENT DOCUMENTS

| | | |
|---|---|---|
| 2006/0199612 A1 | 9/2006 | Beyer, Jr. et al. |
| 2006/0215220 A1* | 9/2006 | Yamahara et al. ........... 358/1.15 |
| 2007/0010942 A1* | 1/2007 | Bill ................................ 701/209 |
| 2007/0118645 A1* | 5/2007 | Suters .......................... 709/225 |
| 2007/0129880 A1* | 6/2007 | Thacher ....................... 701/202 |
| 2007/0216566 A1* | 9/2007 | Wood .............................. 342/41 |
| 2007/0225902 A1 | 9/2007 | Gretton et al. |
| 2008/0109153 A1 | 5/2008 | Gueziec |
| 2008/0189030 A1* | 8/2008 | Aoki ............................. 701/201 |
| 2008/0234929 A1* | 9/2008 | Watson et al. ................ 701/207 |
| 2008/0281168 A1* | 11/2008 | Gibson et al. ................. 600/301 |
| 2009/0177373 A1* | 7/2009 | Groenhuijzen et al. ...... 701/117 |
| 2009/0248178 A1* | 10/2009 | Paulson et al. .................. 700/66 |
| 2009/0281719 A1* | 11/2009 | Jakobson ...................... 701/201 |
| 2009/0312888 A1* | 12/2009 | Sickert et al. ..................... 701/1 |
| 2009/0319172 A1* | 12/2009 | Almeida et al. .............. 701/201 |
| 2010/0057333 A1* | 3/2010 | Yun ............................... 701/117 |
| 2010/0114480 A1* | 5/2010 | Sugiyama et al. ............ 701/207 |

FOREIGN PATENT DOCUMENTS

| | | |
|---|---|---|
| JP | A-2005-157410 | 6/2005 |
| JP | A-2006-178228 | 7/2006 |
| JP | A-2007-3262 | 1/2007 |
| JP | A-2007-011161 | 1/2007 |
| JP | A-2007-278807 | 10/2007 |
| JP | A-2008-281487 | 11/2008 |
| JP | A-2009-19910 | 1/2009 |
| JP | A-2010-102685 | 5/2010 |

OTHER PUBLICATIONS

Office Action dated Jun. 3, 2014 issued in Japanese Patent Application No. 2010-123593 (with English translation).

* cited by examiner

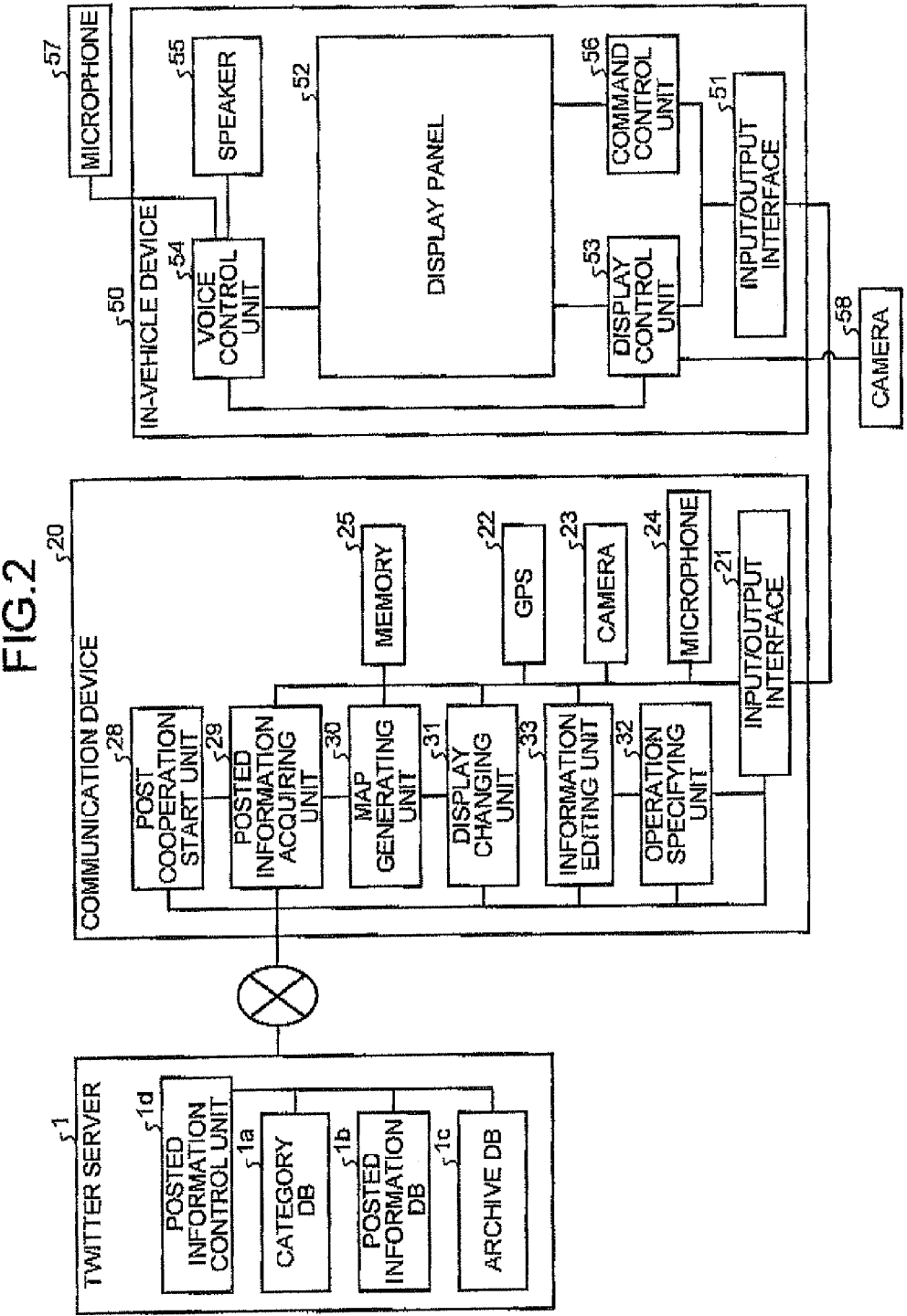

FIG.3

| NUM-BER | TAG | CLASSIFIED CATEGORY | | ELAPSED TIME | DISPLAY METHOD | |
|---|---|---|---|---|---|---|
| 1 | #Tra | TRAFFIC | Traffic | WITHIN 5 MINUTES | ICON (SPEECH BUBBLE) | ROSE |
| 2 | | | | WITHIN 30 MINUTES | ICON (SPEECH BUBBLE) | PINK |
| 3 | | | | LESS THAN 1 HOUR | ICON | RED |
| 4 | | | | LESS THAN 12 HOURS | ICON | DARK RED |
| 5 | | | | 12 HOURS OR MORE | DELETE | |
| 6 | #Wea | WEATHER | Weather | WITHIN 5 MINUTES | ICON (SPEECH BUBBLE) | LAVENDER |
| 7 | | | | WITHIN 30 MINUTES | ICON (SPEECH BUBBLE) | PLUM |
| 8 | | | | LESS THAN 1 HOUR | ICON | PURPLE |
| 9 | | | | LESS THAN 12 HOURS | ICON | DARK PURPLE |
| 10 | | | | 12 HOURS OR MORE | DELETE | |
| 11 | #Sce | SCENE | Scene | WITHIN 5 MINUTES | ICON (SPEECH BUBBLE) | BRIGHT GREEN |
| 12 | | | | WITHIN 30 MINUTES | ICON (SPEECH BUBBLE) | SEA GREEN |
| 13 | | | | LESS THAN 1 HOUR | ICON | GREEN |
| 14 | | | | LESS THAN 12 HOURS | ICON | DARK GREEN |
| 15 | | | | 12 HOURS OR MORE | DELETE | |
| 16 | #Cus | CUSTOM | Custom | WITHIN 5 MINUTES | ICON (SPEECH BUBBLE) | YELLOW |
| 17 | | | | WITHIN 30 MINUTES | ICON (SPEECH BUBBLE) | ORANGE |
| 18 | | | | LESS THAN 1 HOUR | ICON | BEIGE |
| 19 | | | | LESS THAN 12 HOURS | ICON | BROWN |
| 20 | | | | 12 HOURS OR MORE | DELETE | |
| 21 | #Inf | INFORMATION | Information | WITHIN 5 MINUTES | ICON (SPEECH BUBBLE) | SKY BLUE |
| 22 | | | | WITHIN 30 MINUTES | ICON (SPEECH BUBBLE) | BRIGHT BLUE |
| 23 | | | | LESS THAN 1 HOUR | ICON | BLUE |
| 24 | | | | LESS THAN 12 HOURS | ICON | SEA BLUE |
| 25 | | | | 12 HOURS OR MORE | DELETE | |

FIG.4

| TAG | CONTENT |
|---|---|
| #Tra | IN TRAFFIC JAM |
| #Cus | - |

FIG.5

CURRENT TIME 10:28:00

| POST DATE AND TIME | TAG | CONTENT | GEOGRAPHICAL LOCATION DATA | MOVING PICTURE | VOICE | CLASSIFI-CATION RESULT | ELAPSED TIME | DISPLAY METHOD | |
|---|---|---|---|---|---|---|---|---|---|
| 2010/4/26 10:00:00 | #Tra | IN TRAFFIC JAM | OO INTERSECTION, KOBE-SHI, HYOGO-KEN | 111.jpeg | - | TRAFFIC | WITHIN 30 MINUTES | ICON (SPEECH BUBBLE) | PINK |
| 2010/4/26 10:00:02 | #Wet | VISIBILITY IS POOR BECAUSE OF DENSE FOG | OO1-CHOME, KOBE-SHI, HYOGO-KEN | - | - | - | - | - | - |
| 2010/4/26 10:26:35 | #Sce | BEAUTIFUL SCENERY | ROKKOSAN ×× | NIGHT VIEW.mpeg | PRES-ENT | SCENE | WITHIN 5 MINUTES | ICON (SPEECH BUBBLE) | BRIGHT GREEN |
| 2010/4/26 10:27:00 | #Ill | NOW, 100 YEN/L! | OO3-CHOME, KOBE-SHI, HYOGO-KEN | - | - | - | - | - | - |
| ... | ... | ... | ... | ... | ... | ... | ... | ... | ... |

IN-VEHICLE DISPLAY APPARATUS AND DISPLAY METHOD

CROSS-REFERENCE TO RELATED APPLICATIONS

This application is based upon and claims the benefit of priority of the prior Japanese Patent Application No. 2010-123593, filed on May 28, 2010, the entire contents of which are incorporated herein by reference.

BACKGROUND OF THE INVENTION

1. Field of the Invention

The present invention relates to an in-vehicle display apparatus and a display method.

2. Description of the Related Art

In-vehicle devices, such as car navigation devices, have been proposed which display information that is obtained in real time by, for example, a Vehicle Information and Communication System (VICS) or a Radio Data System (RDS) using radio waves on a display. In addition, in-vehicle devices have been proposed which display real-time information that is acquired from the screen of the Internet by wireless communication using, for example, Bluetooth (registered trademark) or real-time information acquired by a distribution-type probe on a display.

In recent years, in-vehicle devices have been known which display, for example, a voice message or an icon in which geographical location data is associated with a short message on the map. For example, the user operates the touch panel of the in-vehicle device to post the geographical location data and a text message or uses a mobile phone to post a voice message. Then, the in-vehicle device receives the posts and displays the posted information, such as the received messages article, as an icon at the position on the map specified by the received geographical location data.

When the user selects the icon, the in-vehicle device displays the site of the posted message or outputs the voice message attached to the selected icon. When there is a plurality of posts at the same position, the in-vehicle device changes, for example, the shapes or colors of the icons and displays the plurality of posts at the same time. When any one of the icons is selected, the in-vehicle device displays a list of posts in the vicinity of the selected position such that each post can be selected. In addition, the in-vehicle device may perform display limit such that only a specific item is displayed.

In recent years, open tools (services), such as Twitter (registered trademark), capable of sharing information in real time using information communication apparatuses, such as smart phones, mobile phones, and personal computers have come into widespread use. For example, the user starts Twitter (registered trademark), posts a short sentence including a predetermined number of characters, which is called a "tweet," refers to the response of other persons to the post, and communicates with other persons. In addition, an Application Program Interface (API) related to geographical location data is opened to the public and Twitter (registered trademark) can transmit information related to each region or position.

However, in the related art, such as Japanese Patent Application Laid-open No. 2007-278807, it is difficult for the user to know the content of the posted information displayed on the in-vehicle device at a glance. Therefore, there is a concern that the reading of the posted information or the posting of information will have an adverse effect on safe driving.

Specifically, since the in-vehicle device according to the related art displays all of the posted information, such as blog articles or tweets, acquired in real time on the screen, it is difficult for the user, such as the driver, to know the content of an enormous amount of posted information displayed on the in-vehicle device. Therefore, the driver take the eyes off the road during driving in order to operate the in-vehicle device to read the content of the posted information. As a result, it is difficult for the driver to concentrate on driving, which has an adverse effect on safe driving. In addition, the driver needs to directly operate the in-vehicle device to post information. In this case, it is difficult for the driver to concentrate on driving, which has an adverse effect on safe driving. Therefore, the structure in which the user perform a complicated operation is not preferable.

Meanwhile, it is considered that, after driving ends, the driver reads the posted information displayed on the in-vehicle device or posts information in order to ensure safe driving. However, in this case, when driving ends, the latest information is not obtained and real-time processing deteriorates. Therefore, it is difficult to transmit useful information in real time and effective use for example, blogs or Twitter (registered trademark).

SUMMARY OF THE INVENTION

It is an object of the present invention to at least partially solve the problems in the conventional technology.

According to an aspect of an embodiment of the invention, An in-vehicle display apparatus that is provided in a vehicle, includes an information acquiring unit that acquires information posted to a server; a display unit that displays the posted information acquired by the information acquiring unit using a display method that is changed on the basis of the time from the posting of the information to the acquisition of the posted information by the information acquiring unit and a category of the posted information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram illustrating the structure of the in-vehicle display apparatus;

FIG. 3 is a diagram illustrating an example of information stored in a category DB;

FIG. 4 is a diagram illustrating an example of archive conditions stored in the category DB;

FIG. 5 is a diagram illustrating an example of information stored in a posted information DB;

DETAILED DESCRIPTION OF THE PREFERRED EMBODIMENTS

Figure 1:
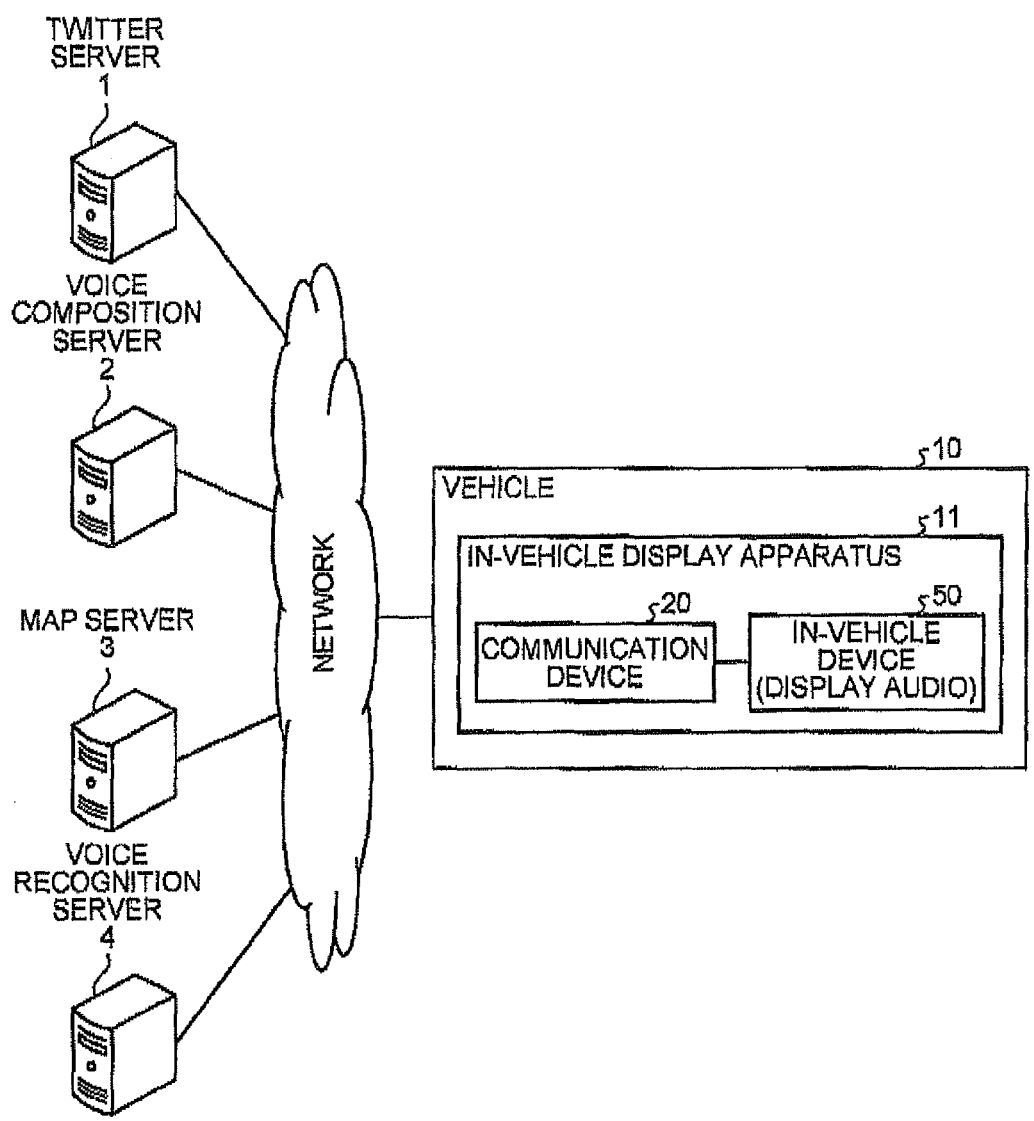
FIG. 1 is a diagram illustrating the overall structure of a system including an in-vehicle display apparatus according to a first embodiment.

FIG. 1 is a diagram illustrating the overall structure of a system including an in-vehicle display apparatus according to a first embodiment. As illustrated in FIG. 1, the system includes a Twitter server 1, a voice composition (text-to-speech) server 2, a map server 3, a voice recognition server 4, and an in-vehicle display apparatus 11 that is provided in a vehicle 10 such as a car. In this embodiment, Twitter (registered trademark) is used as posted information, but the invention is not limited thereto. For example, post services, such as a bldg, a simple mail, and a Social Network Service (SNS), may be used as the posted information.

The Twitter server 1 is a posted information server that stores posted information, such as tweets that are posted by the individual users who are identified by their user IDs with, for example, their mobile phones. In addition, when voice data is added to the posted information, the Twitter server 1 stores the added voice data in the voice composition server 2. When map data is added to the posted information, the Twitter server 1 stores the added map data in the map server 3.

When the user receives a request to acquire posted information, the Twitter server 1 transmits the stored posted information to the mobile phone of the user. For example, the Twitter server 1 transmits the posted information stored between the previous acquisition request and the current acquisition request. Various methods can be used to transmit the posted information. For example, the Twitter server 1 may transmit only the posted information of another user followed by the user, that is, the posted information of a user designated by the user, who is a request source, in the posted information stored between the previous acquisition request and the current acquisition request. In addition, the Twitter server 1 may transmit only the information posted from the current position of the user to a position in a predetermined range in the posted information stored between the previous acquisition request and the current acquisition request.

The voice composition server 2 composes the information posted to the Twitter server 1 with the voice data added to the information. For example, the voice composition server 2 receives an identifier for identifying the posted information and the voice data from the Twitter server 1 and stores them so as to be associated with each other. The voice composition server 2 receives a request to acquire the voice data added to the posted information acquired from the Twitter server 1 from the user. Then, the voice composition server 2 specifies voice data with, for example, the identifier included in the acquisition request and transmits the specified voice data to the user.

The map server 3 composes the information posted to the Twitter server 1 and the map data added to the information. For example, the map server 3 receives, for example, the identifier for identifying the posted information and the map data from the Twitter server 1 and stores them so as to be associated with each other. Then, the map server 3 receives a request to acquire the map data added to the posted information acquired from the Twitter server 1 from the user. Then, the map server 3 specifies map data with, for example, the identifier included in the acquisition request and transmits the specified map data to the user.

The voice recognition server 4 comprehends the voice of the user, converts the voice into text, and transmits the text to the Twitter server 1. The user can post information only by transmitting a voice to the voice recognition server 4, in addition to by generating information with, for example, a portable terminal and then posting the information. As such, since a voice is recognized and information is posted, the driver does not need to perform a complicated operation and safe driving is ensured.

In this embodiment, in FIG. 1, the Twitter server 1, the voice composition server 2, the map server 3, and the voice recognition server 4 are provided in different housings, but the invention is not limited thereto. For example, the Twitter server 1, the voice composition server 2, the map server 3, and the voice recognition server 4 may be provided in a housing.

The in-vehicle display apparatus 11 is provided in the vehicle 10 and includes a communication device 20 and an in-vehicle device 50. In FIG. 1, in the in-vehicle display apparatus 11, the communication device 20 and the in-vehicle device 50 are provided in different housings, but the invention is not limited thereto. For example, the communication device 20 and the in-vehicle device 50 may be provided in a housing.

The communication device 20 is, for example, a mobile phone, a personal computer, or a smart phone that can be connected to the Web or the Internet, and is connected to the in-vehicle device 50 by, for example, wireless communication or a Universal Serial Bus (USB). The communication device 20 outputs various kinds of data, such as posted information, voice data, and map data, to the in-vehicle device 50 and performs various kinds of processes according to the content of the operation of the user input through, for example, a touch panel of the in-vehicle device 50.

The in-vehicle device 50 is a Display Audio (DA) that includes a liquid crystal monitor, such as a touch panel or a display, has basic functions, such as a display function, an audio reproducing function, and a communication function with a portable terminal, and cooperates with the communication device 20 to implement various functions. Therefore, the in-vehicle device 50 used in this embodiment is inexpensive, as compared to high-precision in-vehicle devices provided in the vehicle, and it is expected that the in-vehicle device 50 will be widely spread.

The in-vehicle device 50 according to this embodiment is not necessarily the DA, but may be a high-precision in-vehicle device having, for example, a navigation function. In this case, data (the content of posted information and geographical location data) except for the map is transmitted to the in-vehicle device 50 and the in-vehicle device 50 displays the content of the posted information on the map data that is locally stored.

The in-vehicle device 50 displays the posted information or map data received from the communication device 20 on the liquid crystal monitor and outputs the voice data received from the communication device 20 as a voice from the speaker. In addition, the in-vehicle device 50 transmits geographical location data, such as coordinates indicating an operation position, as information input through the display panel by the user to the communication device 20.

Next, the structure of the in-vehicle display apparatus illustrated in FIG. 1 will be described with reference to FIG. 2. FIG. 2 is a block diagram illustrating the structure of the in-vehicle display apparatus. As illustrated in FIG. 2, the in-vehicle display apparatus is connected to the Twitter server 1 and includes the communication device 20 and the in-vehicle device 50. Therefore, each of the communication device 20 and the in-vehicle device 50 will be described below.

As illustrated in FIG. 2, the Twitter server 1 includes a category Database (DB) 1a, a posted information DB 1b, an archive DB 1c, and a posted information control unit 1d.

The category DB 1a stores a category display method so as to be associated with the category of the posted information and the elapsed time to post information. FIG. 3 is a diagram illustrating information stored in the category DB. As illustrated in FIG. 3, the category DB 1a stores "a number, a tag, a classified category, elapsed time, and a display method" so as to be associated with each other. Among the stored items, the "number" is the identifier of a record stored in the category and the "tag" indicates a hash tag included in the posted information, such as a tweet. The "classified category" indicates a category far classifying the posted information, and the "elapsed time" indicates the time elapsed from the posting of information to the reception of an acquisition request from a posted information acquiring unit 29. The "display method" indicates a format or a color when the posted information is displayed on the in-vehicle device 50.

The numbers "1 to 5" illustrated in FIG. 3 indicate that posted information with "tag=#Tra" is sorted into a "classified category=traffic/Traffic" and the "display method" is determined by the "elapsed time." For example, posted information "tag=#Tra, classification=traffic/Traffic, and the elapsed time=within 5 minutes" with the number "1" is displayed as a "speech bubble-type rose icon" on the map data. Similarly, posted information "tag=#Tra, classification=traffic/Traffic, and the elapsed time=within 30 minutes" with the number "2" is displayed as a "speech bubble-type pink icon" on the map data. Posted information "tag=#Tra, classification=traffic/Traffic, and the elapsed time=less than 1 hour" with the number "3" is displayed as a "general red icon" on the map data. Posted information "tag=#Tra, classification=traffic/Traffic, and the elapsed time=less than 12 hours" with the number "4" is displayed as a "general dark red icon" on the map data. Posted information "tag=#Tra, classification=traffic/Traffic, and the elapsed time 12 hours or more" with the number "5" is not displayed on the map data, but is "deleted."

That is, the posted information categorized into "traffic/Traffic" with the "tag=#Tra" is displayed in gradation such that it is displayed in a brighter reddish color as the time elapsed from the posting of information to the Twitter server 1 to the acquisition of the information by the in-vehicle display apparatus 11 is reduced and it is displayed in a darker reddish color as the elapsed time increases.

The numbers "6 to 10" illustrated in FIG. 3 indicate that posted information with a "tag=#Wee" is sorted into a "classified category=weather/Weather" and the "display method" is determined by the "elapsed time," For example, posted information "tag=#Wea, classification weather/Weather, and the elapsed time=within 5 minutes" with the number "6" is displayed as a "speech bubble-type lavender icon" on the map data. Similarly, posted information "tag=#Wea, classification=weather/Weather, and the elapsed time=within 30 minutes" with the number "7" is displayed as a "speech bubble-type plum icon" on the map data. Posted information "tag=#Wea, classification weather/Weather, and the elapsed time=less than 1 hour" with the number "8" is displayed as a "general purple icon" on the map data Posted information "tag=#Wea, classification=weather/Weather, and the elapsed time=less than 12 hours" with the number "9" is displayed as a "general dark purple icon" on the map data. Posted information "tag=#Wea, classification=weather/Weather, and the elapsed time=12 hours or more" with the number "10" is not displayed on the map data, but is "deleted."

That is, the posted information categorized into "weather/Weather" with the "tag=#Wea" is displayed in gradation such that it is displayed in a brighter purplish color as the time elapsed from the posting of information to the Twitter server 1 to the acquisition of information by the in-vehicle display apparatus 11 is reduced and it is displayed in a darker purplish color as the elapsed time increases.

The numbers "11 to 15" illustrated in FIG. 3 indicate that posted information with a "tag=#Sce" is sorted into a "classified category=scene/Scene" and the "display method" is determined by the "elapsed time." For example, posted information "tag=#Sce, classification scene/Scene, and the elapsed time=within 5 minutes" with the number "11" is displayed as a "speech bubble-type bright green icon" on the map data. Similarly, posted information "tag=#Sce, classification=scene/Scene, and the elapsed time=within 30 minutes" with the number "12" is displayed as a "speech bubble-type see green icon" on the map data. Posted information "tag=#Sce, classification=scene/Scene, and the elapsed time=less than 1 hour" with the number "13" is displayed as a "general green icon" on the map data. Posted information "tag=#Sce, classification=scene/Scene, and the elapsed time=less than 12 hours" with the number "14" is displayed as a "general dark green icon" on the map data. Posted information "tag #Sce, classification scene/Scene, and the elapsed time=12 hours or more" with the number "15" is not displayed on the map data, but is "deleted."

That is, the posted information categorized into "scene/Scene" with the "tag=#Sce" is displayed in gradation such that it is displayed in a brighter greenish color as the time elapsed from the posting of information to the Twitter server 1 to the acquisition of information by the in-vehicle display apparatus 11 is reduced and it is displayed in a darker greenish color as the elapsed time increases.

The numbers "16 to 20" illustrated in FIG. 3 indicate that posted information with a "tag=#Cus" is sorted into a "classified category=custom/Custom" and the "display method" is determined by the "elapsed time." For example, posted information "tag=#Cus, classification=custom/Custom, and the elapsed time=within 5 minutes" with the number "16" is displayed as a "speech bubble-type yellow icon" on the map data. Similarly, posted information "tag=#Cus, classification=custom/Custom, and the elapsed time=within 30 minutes" with the number "17" is displayed as a "speech bubble-type orange icon" on the map data Posted information "tag=#Cus, classification=custom/Custom, and the elapsed time=less than 1 hour" with the number "18" is displayed as a "general beige icon" on the map data Posted information "tag=#Cus, classification=custom/Custom, and the elapsed time=less than 12 hours" with the number "19" is displayed as a "general brown icon" on the map data. Posted information "tag=#Cus, classification=custom/Custom, and the elapsed time=12 hours or more" with the number "20" is not displayed on the map data, but is "deleted."

That is, the posted information categorized into "custom/Custom" with the "tag=#Cus" is displayed in gradation such that it is displayed in a brighter yellowish color as the time elapsed from the posting of information to the Twitter server 1 to the acquisition of information by the in-vehicle display apparatus 11 is reduced and it is displayed in a darker yellowish color as the elapsed time increases.

The numbers "21 to 25" illustrated in FIG. 3 indicate that posted information with a "tag=#Inf" is sorted into a "classified category=information/Information" and the "display method" is determined by the "elapsed time." For example, posted information "tag=#Inf, classification=information/Information, and the elapsed time=within 5 Minutes" with the number "21" is displayed as a "speech bubble-type sky blue icon" on the map data. Similarly, posted information "tag=#Inf, classification=information/Information, and the elapsed time=within 30 minutes" with the number "22" is displayed as a "speech bubble-type light blue icon" on the map data. Posted information "tag=#Inf, information/Information, and the elapsed time=less than 1 hour" with the number "23" is displayed as a "general blue icon" on the map data. Posted information "tag=#Inf, classification=information/Information, and the elapsed time=less than 12 hours" with the number is "24" is displayed as a "general sea blue icon" on the map data Posted information "tag=#Inf, classification information/Information, and the elapsed time=12 hours or more" with the number "25" is not displayed on the map data, but is "deleted."

That is, the posted information categorized into "information/Information" with the "tag=#Inf" is displayed in gradation such that it is displayed in a brighter bluish color as the time elapsed from the posting of information to the Twitter server 1 to the acquisition of information by the in-vehicle display apparatus 11 is reduced and it is displayed in a darker bluish color as the elapsed time increases.

Figure 4:
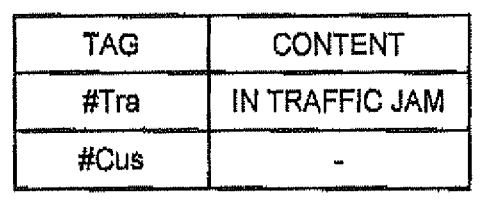

The category DB 1a stores conditions that are not deleted even when the elapsed time increases, that is, archive conditions. FIG. 4 illustrates an example of the archive conditions stored in the category DB, in which an archive target is specified for each category. As illustrated in FIG. 4, the category DB 1a stores as the archive conditions a "tag," which is an archive target, and "content" indicating the content of the posted information to be archived so as to be associated with each other. For example, when the "tag and content" are "#Tra and traffic jam," posted information "traffic jam" with the "tag #Tra" is archived without being deleted. When the "tag and content" are "#Cus and –," posted information with the "tag=#Cus" is archived without being deleted, regardless of the content of the posted information.

As another embodiment, a hash tag may be used to sort the posted information (which is deleted over time) that is displayed in real time and the posted information (which is stored regardless of the elapse of time) that is archived. Specifically, a hash tag "#real" is given to real-time posted information and a hash tag "#arc" is given to the posted information that is archived. As a method of representing the sorting of "category" and "archive" with the hash tag, a hyphen arc may be added like "#Tra-arc."

Returning to FIG. 2, the posted information DB 1b stores the posted information acquired by the Twitter server 1 and a method of displaying the posted information. FIG. 5 is a diagram illustrating an example of the information stored in the posted information DB. As illustrated in FIG. 5, the posted information DB 1b stores "post date and time, a tag, content, geographical location data, a moving picture, a voice, a classification result, the elapsed time, and a display method" so as to be associated with each other. The posted information stored in the posted information DB 1b is deleted in a chronological order under predetermined conditions, such as a condition that the elapsed time is one day or more and a condition that the capacity of the DB is less than a predetermined value.

Among the stored items, the "post date and time" indicates the date and time when information is posted, and the "tag" indicates a bash tag included in the posted information, such as a tweet. The "content" indicates the content of the posted information, that is, the content of a tweet, and the "geographical location data" indicates the display position of the posted information. In addition, the "moving picture" indicates whether there is moving picture data added to the posted information. When there is moving picture data, the file name of the moving picture data is stored. When there is no moving picture data, a sign "–" is stored. The "voice" indicates whether there is voice data added to the posted information. When there is voice data, the file name of the voice data is stored. When there is no voice data, a sign "–" is stored. The "classification result" indicates the classification result of information by a map generating unit 30, which will be described below. When information cannot be classified, a sign "–" is stored in the field "classification result" and the information is excluded from a display target. The "elapsed time" indicates the time elapsed from the posting of information to now and the "display method" indicates a posted information display method determined by a display changing unit 31.

For example, information when the current time is 10:28:00 will be described in detail with reference to FIG. 5. In the first row of FIG. 5, posted information "traffic jam" posted at "2010/4/26 10:00:00" has a "tag=#Tra," the posted position of the information is "oo intersection, Kobe-shi, Hyogo-ken," "111.jpeg" is added to the posted information, and the category of the posted information is "traffic." In addition, since the time elapsed from the posting of information is "28 minutes," it is determined that the posted information "traffic jam" is displayed as a "speech bubble-type pink icon."

In the second row of FIG. 5, posted information "visibility is poor because of dense fog" posted at "2010/4/26 10:00:02" has a "tag=#Wet," the posted position of the information is "oo 1-chome, Kobe-shi, Hyogo-ken," and the posted information is not classified into any category. Since the posted information "visibility is poor because of dense fog" is not classified into any category, it is not displayed on the map data and the display method is not determined.

In the third rod of FIG. 5, posted information "beautiful scenery" posted at "2010/4/26 10:26:35" has a "tag=#Sce," the posted position of the information is "Rokkosan xx," "night view.mpeg" is added to the posted information, and the posted information is classified into a category "scene." In addition, since the time elapsed from the posting of the posted information "beautiful scenery" is "1 minute and 25 seconds," it is determined that the posted information is displayed as a "speech bubble-type bright green icon."

In the fourth row of FIG. 5, posted information "Now, 100 yen/Ll" posted at "2010/4/26 10:27:00" has a "tag=#Ill," the posted position of the information is "oo 3-chome, Kobe-shi, Hyogo-ken," and the posted information is not classified into any category. In addition, since the posted information "Now, 100 yen/Ll" is not classified into any category, it is not displayed on the map data and the display method is not determined.

The archive DB 1c stores the posted information that is determined to be archived by the posted information control unit 1d, which will be described below. For example, the archive DB 1c stores posted information matched with the archive conditions in the posted information stored in the posted information DB 1b. In addition, even when the posted information is determined to be "deleted" due to, for example, the elapse of time, the posted information matched with the archive conditions is archived.

For example, the user can operate the communication device 20 or the in-vehicle device 50 to arbitrarily change the setting of the information stored in the category DB 1a, the posted information DB 1b, and the archive DB 1c. Each of the category DB 1a, the posted information DB 1b, and the archive DB 1c is a semiconductor memory device, such as a Random Access Memory (RAM), or a storage device, such as a hard disk. Each of the "tag," the "classified category," and the "display method" illustrated in FIG. 3 may be arbitrarily set and a combination thereof may be arbitrarily set. That is, the user can arbitrarily set the classification of the "tag" into the "category" and the display method thereof.

The posted information control unit id controls the reception and transmission of the posted information. For example, when receiving the posted information from, for example, a mobile phone of the user, the posted information control unit id acquires posted information including "2010/05/11 12:00: 15, #Tra, in traffic jam, oo Tokyo, traffic jam.mpeg, and there is a voice" as "post date and time, tag, content, geographical location data, moving picture, and voice" as the posted information. The acquired posted information "post date and time, tag, content, geographical location data, moving picture, and voice" is the same as that illustrated in FIG. 5 and thus a detailed description thereof will be omitted. At this time, the posted information DB 1b stores only the "post date and time, tag, content, geographical location data, moving picture, and voice" included in the posted information, but does not store the "classification result, elapsed time, and display method."

Then, when receiving a posted information acquisition request from the communication device 20, the posted information control unit 1d calculates "the time elapsed" from the reception time the current time) of the request and the time when the information is posted and stores the elapsed time in the posted information DB 1b. In addition, the posted information control unit 1d specifies the "display method" and "category" corresponding to the "tag" for each record of the posted information DB 1b from the category DB is and stores the specified "display method" and "category" in the posted information DB 1b. Then, the posted information control unit 1d transmits the posted information in which the signs of the "display method" and the "category" are not "−" in the posted information DB 1b to the communication device 20.

For example, an example of determining a method of displaying posted information "2010/4/26 11:58:00, #Inf, safe driving, in the vicinity of Sanyo Expressway oo interchange, there is no moving picture, and there is no voice" at the current time "2010/4/26 12:00:00" will be described. In this case, the posted information control unit 1d searches for a tag identical to the "hash tag=Inf" of the posted information from the category DB 1a. Then, since there is a tag identical to the "hash tag=#Inf," the posted information control unit 1d specifies a category corresponding to the tag "#Inf" to be "information." Then, the posted information control unit 1d calculates that the elapsed time is "2 minutes" from the difference between the current time "2010/4/26 12:00:00" and the posted information "2010/4/26 11:58:00." Then, the posted information control unit 1d specifies the "display method" satisfying the category "information" and the elapsed time "2 minutes" to be a "speech bubble-type sky blue icon" with reference to the category DB 1a.

As a result, the posted information control unit 1d stores the category "information," the elapsed time "2 minutes," and the display method "icon (speech bubble), sky blue" in the posted information DB 1b so as to be associated with the posted information "2010/4/26 11:58:00, #Inf, safe driving, in the vicinity of Sanyo Expressway oo interchange, there is no moving picture, and there is no voice."

Next, an example of determining a method of displaying posted information "2010/4/26 11:15:00, #XXX, nice drive-, oo Yamaguchi-ken, there is no moving picture, and there is no voice" at the current time "2010/4/26 12:00:00" will be described. In this case, the posted information control unit 1d searches for a tag identical to the "hash tag=#XXX" of the posted information from the category DB 1a. Since there is no tag identical to the "hash tag=XXX," the posted information control unit 1d determines a category corresponding to the tag "XXX" to be "−." As a result, the posted information control unit 1d stores the category "−," the elapsed time "−," and the display method "−" in the posted information DB 1b so as to be associated with the posted information "2010/4/26 11:15: 00, #XXX, nice drive~, oo Yamaguchi-ken, there is no moving picture, and there is no voice."

When receiving a posted information acquisition request from the communication device 20, the posted information control unit 1d performs the above-mentioned process on all of the posted information stored in the posted information DB 1b. When 200 posted information items are stored in the posted information DB 1b, the posted information control unit 1d performs the above-mentioned process on each of the 200 posted information items to update the posted information DB 1b and change display on the map data.

The communication device 20 includes an input/output interface 21, a Global Positioning System (GPS) 22, a camera 23, a microphone 24, and a memory 25. The communication device 20 includes a post cooperation start unit 28, the posted information acquiring unit 29, a map generating unit 30, the display changing unit 31, an operation specifying unit 32, and an information editing unit 33.

Each of the functional units and the DBs is illustrative, but the functional units of the communication device 20 are not limited thereto. For example, the communication device 20 has a communication function or a Web communication function in addition to the functions of the units and includes, for example, a display. In addition, the communication device 20 may include the category DB 1a, the posted information DB 1b, and the archive DB 1c provided in the Twitter server 1.

The input/output interface 21 is cooperatively connected to the in-vehicle device 50 and is connected to the in-vehicle device 50 by, for example, wired communication, such as USB, or near field wireless communication, such as infrared communication or Bluetooth (registered trademark). For example, the input/output interface 21 transmits Joint Photographic Experts Group (JPEG) image data or Moving Picture Experts Group (MPEG) moving picture data, which is, for example, compressed posted information or map data, or voice data to the in-vehicle device 50. In addition, the input/output interface 21 receives, for example, the coordinates of the operation position of the user from the in-vehicle device 50.

The GPS 22 has a function of communicating with a GPS satellite and acquires the current position of the vehicle. For example, when receiving an instruction to acquire geographical location data from each control unit, the GPS 22 communicates with the GPS satellite to acquire the current position and stores the acquired current position in a storage unit such as a memory.

The camera 23 is provided inside or outside the vehicle and captures images or moving pictures. For example, when receiving an image capture instruction from the operation specifying unit 32 or the information editing unit 33, which will be described below, the camera 23 captures a moving picture or an image, stores the captured moving picture or image in the storage unit, such as a memory, and outputs the captured data to the operation specifying unit 32 or the information editing unit 33. The microphone 24 is provided inside or outside the vehicle and records a voice. For example, when receiving a recording instruction from the operation specifying unit 32 or the information editing unit 33, which will be described below, the microphone 24 records a voice, stores the recorded voice in the storage unit, such as a memory, and outputs the recorded voice data to the operation specifying unit 32 or the information editing unit 33. In the case of a mobile phone, the microphone 24 may be included in the mobile phone or it may be separately connected to the mobile phone. The memory 25 stores the posted information acquired from the Twitter server 1 by the posted information acquiring unit 29.

Returning to FIG. 2, the post cooperation start unit 28 performs a post cooperation of displaying the posted information on the in-vehicle device 50. For example, when detecting that the input/output interface 21 and the in-vehicle device 50 are connected to each other by, for example, a USB, the post cooperation start unit 28 generates image data of the initial screen (main menu) of the post cooperation in the communication device 20 and outputs the image data to the in-vehicle device 50. Then, the post cooperation start unit 28 acquires the resolution or size of, for example, a display of the connected in-vehicle device 50. Then, the post cooperation start unit 28 stores the coordinates of a display panel 52 of the in-vehicle device 50 and the coordinates of the image data of the initial screen in, for example, a memory so as to be associated with each other. As a result, the communication device 20 can specification the correspondence between the operation position on the display panel 52 of the in-vehicle device 50 and a position on the display of the communication device 20. Therefore, the communication device 20 can specify the content of the operation of the user from the coordinates received from the in-vehicle device 50.

As another method of performing post cooperation, when the user selects an icon indicating post cooperation, such as "TwitDrive," which is displayed on the display of the communication device 20, the post cooperation start unit 28 may receive the selection. Then, the post cooperation start unit 28 may control the input/output interface 21 to start connection to the in-vehicle device 50.

The posted information acquiring unit 29 acquires, for example, the information posted by the user, geographical location data indicating the post destination of the posted information, and a display method from the category DB 1e, the posted information DB 1b, and the archive DB 1c through the posted information control unit id of the Twitter server 1. Specifically, when receiving a signal indicating that the in-vehicle device 50 is operated to input an instruction to acquire posted information from the operation specifying unit 32, the posted information acquiring unit 29 is connected to the Twitter server 1 and acquires the posted information. Then, the posted information acquiring unit 29 stores the acquired posted information in the memory 25 and outputs the acquired posted information to the map generating unit 30.

For example, the posted information acquiring unit 29 acquires posted information "2010/05/11 12:00:15, #Tra, traffic jam, oo Tokyo, traffic jam.mpeg, there is a voice, traffic, 2 minutes, and icon (speech bubble)/pink" as "post date and time, tag, content, geographical location data, moving picture, voice, classification result, elapsed time, and display method." The acquired "post date and time, tag, content, geographical location data, moving picture, voice, classification result, elapsed time, and display method" is the same as that illustrated in FIG. 5 and a detailed description thereof will be omitted.

As another method, the posted information acquiring unit 29 transmits the "tag" to the Twitter server 1 under a predetermined condition, such as at an interval of 1 second, and acquires posted information with the "tag." Then, the posted information acquiring unit 29 stores the acquired posted information in the memory 25, and notifies the acquired posted information to the map generating unit 30.

Specifically, when the acquisition condition is satisfied, the posted information acquiring unit 29 transmits "#Tra, #Tra_ARC, #Wea, #Sce, #Cus, #Cus_ARC, and #Inf" that are desired to be displayed to the Twitter server 1. The Twitter server 1 acquires posted information with the received tags "#Tra, #Tra_ARC, #Wea, #Sce, #Cus, #Cus_ARC, and #Inf" among the posted information stored therein, that is, the information posted by all of the users, from the posted information DB 1b and transmits the posted information to the communication device 20. In this way, the posted information acquiring unit 29 can acquire only the posted information desired by the user.

The map generating unit 30 generates map data in which the posted information is displayed at the position specified by the geographical location data which is acquired together with the posted information by the posted information acquiring unit 29. For example, the map generating unit 30 acquires the current position of the in-vehicle display apparatus 11 with the GPS 22 and acquires map data corresponding to the acquired current position from the map server 3. In this case, the map generating unit 30 acquires the map data in, for example, a JPEG format. Then, the map generating unit 30 specifies posted information with geographical location data in the vicinity of the geographical location data acquired by the GPS 22 from the memory 25. Then, the map generating unit 30 specifies the posted position of the posted information on the basis of the geographical location data added to the read posted information and adds the posted information to the map data acquired from the map server 3. The map generating unit 30 outputs the generated map data with the posted information to the display changing unit 31.

The map generating unit 30 may store in another DB posted information having "*-arc (* is not particularly limited)" as the "tag" in the posted information stored in the memory 25. As a result, it is possible to semipermanently store the posted Information that the user wants to store in the vehicle without deleting the posted information. In addition, when the user performs an operation of displaying the posted information stored in another DB, the map generating unit 30 can display the posted information stored in another DB on the map data using the same method as described above.

The display changing unit 31 changes the display of the posted information on the map data generated by the map generating unit 30 using a predetermined display method.

For example, the display changing unit 31 specifies the "display method" of the posted information on the map data generated by the map generating unit 30 from the memory 25. Then, the display changing unit 31 changes the display of the posted information on the map data generated by the map generating unit 30 on the basis of the "display method" (which can be specified from the posted information stored in the memory 25) specified by the Twitter server 1. The display changing unit 31 performs the above-mentioned process on all of the posted information stored in the memory 25 to generate new JPEG map data in which all of the posted information is displayed on one map data item. Then, the display changing unit 31 outputs the newly generated JPEG map data to the in-vehicle device 50.

That is, the display changing unit 31 changes the display method such that posted information "tag=#Tra and classified category=traffic" is displayed in a brighter reddish color as the elapsed time is reduced and is displayed in a darker reddish color as the elapsed time increases. In addition, the display changing unit 31 changes the display method such that posted information "tag=#Wea and classified category=weather" is displayed in a brighter purplish color as the elapsed time is reduced and is displayed in a darker purplish color as the elapsed time increases. The display changing unit 31 changes the display method such that posted information "tag=#Sce and classified category=scene" is displayed in a brighter greenish color as the elapsed time is reduced and is displayed in a darker greenish color as the elapsed time increases. The display changing unit 31 changes the display method such that posted information "tag=#Cus and classified category=custom" is displayed in a brighter yellowish color as the elapsed time is reduced and is displayed in a darker yellowish color as the elapsed time increases. The display changing unit 31 changes the display method such that posted information "tag #Inf and classified category=information" is displayed in a brighter bluish color as the elapsed time is reduced and is displayed in a darker bluish color as the elapsed time increases.

The display changing unit 31 deletes the posted information that is not classified into any category or the posted information in which the "elapsed time" is "12 hours or more" from the map data. In this case, the display changing unit 31 may delete the posted information deleted from the map data from the memory 25.

For example, it is assumed that the category "information," the elapsed time "2 minutes," and the display method "icon (speech bubble), sky blue" are stored in the memory 25 so as to be associated with the posted information "2010/4/26 11:58:00, #Inf, safe driving, in the vicinity of Sanyo Expressway oo interchange, there is no moving picture, and there is no voice." In this case, the display changing unit 31 changes the display of the posted information to a "speech bubble-type sky blue icon."

It is assumed that the category "–," the elapsed time "–," and the display method "–" are stored in the memory 25 so as to be associated with the posted information "2010/4/26 11:15:00, #XXX, nice drive, oo Yamaguchi-ken, there is no moving picture, and there is no voice." In this case, the display changing unit 31 deletes the posted information from the map data.

The display changing unit 31 performs the above-mentioned process on all of the posted information on the map data generated by the map generating unit 30. Therefore, when 200 posted information items are displayed, the display changing unit 31 performs the above-mentioned process on each of the 200 posted information items to update the memory 25 and change display on the map data.

The vehicle provided with the in-vehicle display apparatus 11 is being moved, and the current position of the vehicle varies moment to moment. Therefore, the map generating unit 30 and the display changing unit 31 repeatedly perform the above-mentioned process each time the current position of the vehicle changes. As a result, the in-vehicle device 50 can constantly display map data in which the icon of the posted information is illustrated on the map in the vicinity of the current position of the vehicle. The above-mentioned process is illustrative, but the invention is not limited thereto. For example, the map generating unit 30 may add the available period to the map data acquired from the map server 3, store the map data in, for example, the memory, and reduce the number of times the map data is acquired from the map server 3.

When the user sets a "category" desired to be displayed, the display changing unit 31 may display only a category identical to the "category" that the user wants to display among the posted information items whose display method has been determined. That is, the display changing unit 31 may filter the posted information to be displayed according to the setting of the user.

Returning to FIG. 2, the operation specifying unit 32 specifies the type of operation input by the user to the in-vehicle device 50. Specifically, the operation specifying unit 32 receives the coordinates of the operation position of the user from the in-vehicle device 50. Then, the operation specifying unit 32 specifies a selected portion on the currently displayed screen from the coordinates on the communication device 20 associated by the post cooperation start unit 28 and the coordinates on the in-vehicle device 50, thereby specifying the operation of the user. Then, the operation specifying unit 32 outputs the content of the specified operation or an operation instruction to, for example, the information editing unit 3. For example, when the operation of the user is "pressing posted information," the operation specifying unit 32 outputs an operation instruction, such as an instruction to display the posted information in detail or an instruction to display a list of the posted information items, to the information editing unit 33.

The operation specifying unit 32 may specify the operation of the user using voice recognition. For example, the operation specifying unit 32 collects voice signals from the user through the microphone 24 and transmits the collected voice signals to the voice recognition server 4. When the recognition result received from the voice recognition server 4 is "pressing posted information," the operation specifying unit 32 outputs an operation instruction, such as an instruction to display posted information in detail or an instruction to display a list of posted information items, to the information editing unit 33.

When receiving an operation of displaying the detailed content of the posted information, the information editing unit 33 displays the detailed content of the posted information. That is, the information editing unit 33 edits data on the basis of the operation of the user performed on the image that is transmitted from the display changing unit 31 to the in-vehicle device 50 and then displayed on the in-vehicle device 50 to generate new data and transmits the new data to the in-vehicle device 50.

For example, the information editing unit 33 receives a signal indicating that an operation, such as "pressing posted information" or "pressing the detailed button of posted information" has been performed on the map data displayed on the in-vehicle device 50 from the operation specifying unit 32. Then, the information editing unit 33 acquires information related to the operated posted information from the Twitter server 1 or the memory 25 and outputs the acquired moving picture data or voice data to the in-vehicle device 50. In this case, the information editing unit 33 may output the moving picture or the voice to the in-vehicle device 50 while reproducing the moving picture or the voice.

When receiving the signal indicating that an operation, such as "pressing posted information" or "pressing the detailed button of posted information" has been performed from the operation specifying unit 32, the information editing unit 33 determines whether there is another pasted information item in the vicinity of the operated posted information. When there is another posted information item in the vicinity of the operated posted information, the information editing unit 33 displays a list of all information items including the operated posted information and another posted information item. For example, the information editing unit 33 displays a list of the posted information items sorted in time series on the basis of the time when information is posted, a list of the posted information items sorted in increasing order of the distance from the operation position on the map, or a list of the posted information items sorted in each classified category.

The in-vehicle device 50 includes an input/output interface 51, a display panel 52, a display control unit 53, a voice control unit 54, a speaker 55, and a command control unit 56. The functional units are illustrative, but the functional units of the in-vehicle device 50 are limited thereto. For example, the in-vehicle device 50 may have, for example, a navigation function in addition to the functions of the units. In addition, the in-vehicle device 50 may include a microphone 57 that collects a voice in the vehicle or a camera 58 that captures the moving pictures of the inside or outside of the vehicle.

The input/output interface 51 is cooperatively connected to the communication device 20 and is connected to the communication device 20 by, for example, wired communication, such as USB, or near field wireless communication, such as infrared communication or Bluetooth (registered trademark). For example, the input/output interface 51 receives JPEG image data or MG moving picture data, which is, for example, compressed posted information or map data, or voice data to the communication device 20. In addition, the input/output interface 51 transmits, for example, the coordinates of the operation position of the user from the communication device 20.

The display panel 52 is a display or a touch panel that displays image data input from the display control unit 53, which will be described below. The display control unit 53 displays the image data received from the communication device 20 through the input/output interface 51 on the display panel 52 and outputs voice data received from the communication device 20 to the voice control unit 54.

The voice control unit 54 receives the voice data from the display control unit 53 and stores the voice data. When receiving an instruction to output a voice through the display panel 52, the voice control unit 54 reproduces the instructed voice and outputs the voice from the speaker 55. The command control unit 56 specifies a position on the display panel 52 that is touched (operated) by the user and transmits the coordinates indicating the specified position to the communication device 20 through the input/output interface 51.

Next, an example of a screen that is generated by the communication device 20 and then displayed on the in-vehicle device 50 and the transition of the screen will be described with reference to FIGS. 6 to 9.

Figure 6:
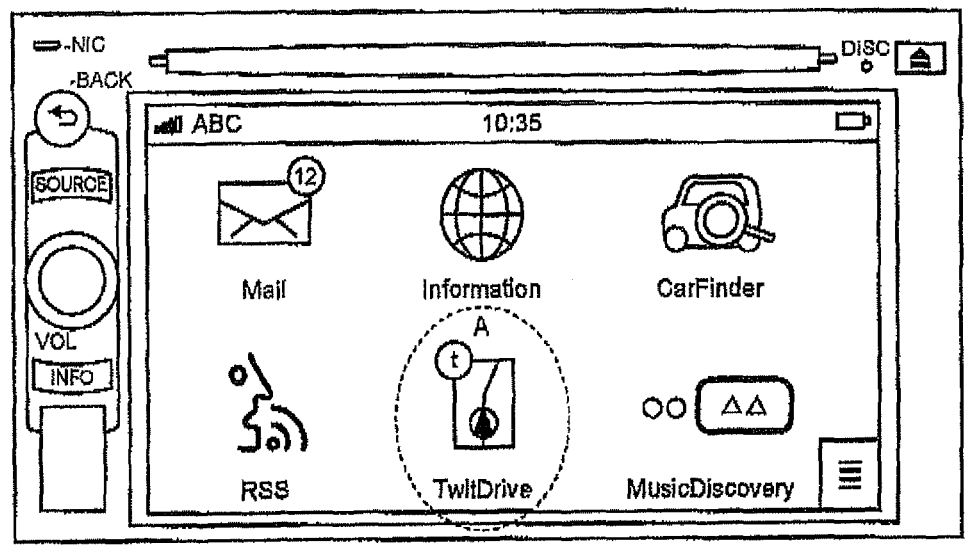
FIG. 6 is a diagram illustrating an initial screen in the post cooperation between a communication device and an in-vehicle device.

First, FIG. 6 illustrates an initial screen of the post cooperation between the communication device and the in-vehicle device. When detecting that the input/output interface 21 and the in-vehicle device 50 are connected to each other by, for example, a USB, the post cooperation start unit 28 of the communication device 20 generates initial screen data illustrated in FIG. 6 and transmits it to the in-vehicle device 50. Then, the display control unit 53 of the in-vehicle device 50 displays the received screen illustrated in FIG. 6 on the display panel 52.

When the user selects "TwitDrive" illustrated in (A) of FIG. 6, the command control unit 56 of the in-vehicle device 50 transmits the coordinates indicating the position of the selected "TwitDrive" to the communication device 20. The operation specifying unit 32 of the communication device 20 specifies that the "TwitDrive" is selected from the received coordinates and outputs an instruction to acquire information to the posted information acquiring unit 29. In this case, the operation specifying unit 32 may display a main menu for user setting or filtering setting.

Then, the map generating unit 30 acquires the position of the vehicle using the GPS 22 and acquires map data corresponding to the acquired position of the vehicle from the map server 3. Then, the map generating unit 30 transmits map data for the periphery of the vehicle as the initial screen of "TwitDrive" to the in-vehicle device 50 and the in-vehicle device 50 outputs the map data to the display panel 52.

Figure 7:
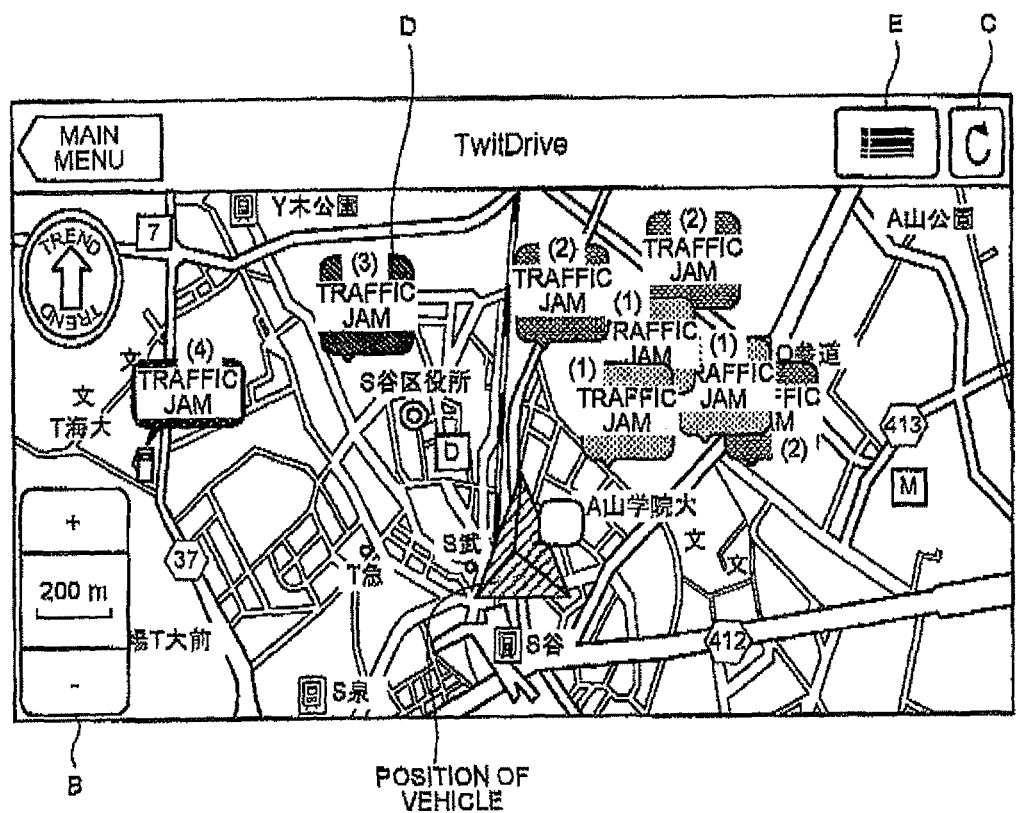
FIG. 7 is a diagram illustrating an example of a screen displayed by the post cooperation between the communication device and the in-vehicle device.

Then, the display changing unit 31 changes the display method of the posted information on the map data generated by the map generating unit 30 to generate a screen illustrated in FIG. 7, which is new map data, and displays the screen on the in-vehicle device 50. FIG. 7 illustrates an example of the screen displayed by the post cooperation between the communication device and the in-vehicle device. Specifically, the map generating unit 30 adds (B) a function of enlarging or reducing map data and (C) a function of refresh all of the data displayed on the screen. In addition, the map generating unit 30 adds (E) a function of displaying a list of posted information items added to the map data and (D) posted information stored in the memory 25 or the Twitter server 1 to the map data.

The display changing unit 31 changes the posted information displayed on the map data generated by the map generating unit 30 in a "display format" specified by the "category" and the "elapsed time" stored in the memory 25 to generate new map data. For example, the display changing unit 31 changes display such that only the posted information "traffic jam" is displayed and changes display such that the posted information is displayed in a brighter color as the "elapsed time" is reduced. In FIG. 7, the display changing unit 31 displays the posted information items such that the brightness of the posted information items is reduced in the order of the posted information items (1), (2), (3), and (4). That is, the "elapsed time" increases in the order of the posted information items (1), (2), (3), and (4).

Next, (B), (C), (D), and (E) illustrated in FIG. 7 will be described. When "+" illustrated in (B) of FIG. 7 is selected on the in-vehicle device 50, the information editing unit 33 generates screen data in which the displayed map data is enlarged and transmits the screen data to the in-vehicle device 50. The display control unit 53 of the in-vehicle device 50 displays the received enlarged screen data on the display panel 52. When "−" illustrated in (B) of FIG. 7 is selected, the information editing unit 33 generate screen data in which the displayed map data is reduced and transmits the screen data to the in-vehicle device 50. The display control unit 53 of the in-vehicle device 50 displays the received reduced screen data on the display panel 52.

As a method of generating the enlarged screen data or the reduced screen data, the information editing unit 33 acquires the enlarged map data or the reduced map data of the displayed screen data from the map server 3, generates screen data for displaying posted information from the acquired enlarged map data or the reduced map data using the same method as described above, and transmits the screen data to the in-vehicle device 50.

When (C) of FIG. 7 is selected on the in-vehicle device 50, the information editing unit 33 transmits the previously displayed image data of the currently displayed image data to the in-vehicle device 50, and the display control unit 53 of the in-vehicle device 50 displays the received previous image data on the display panel 52. In this case, the map data and the posted information are updated by receiving current status from each corresponding server.

Figure 8:
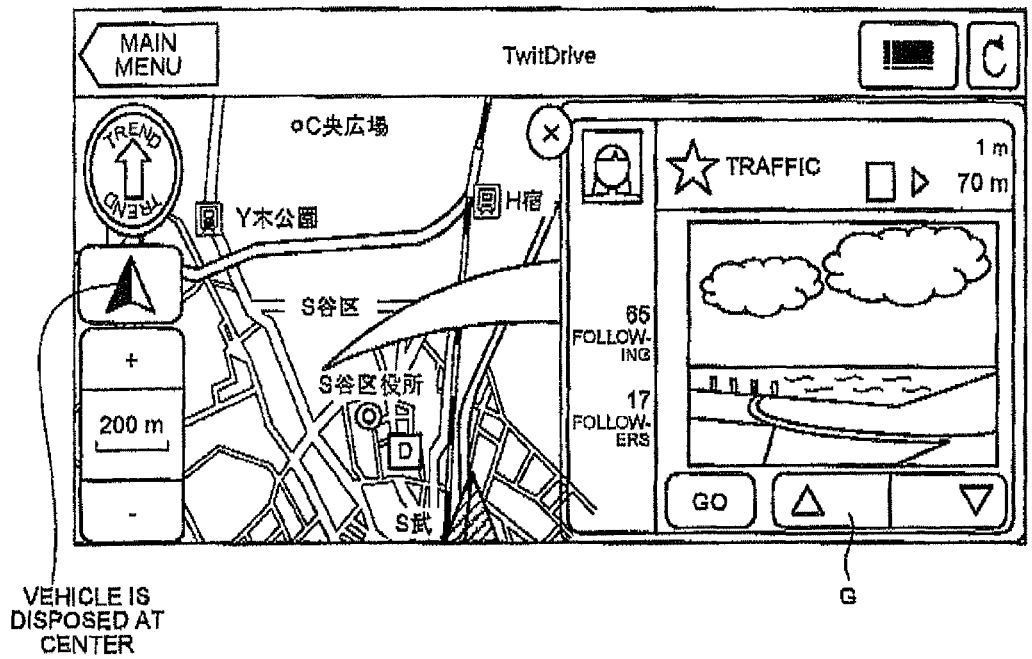
FIG. 8 is a diagram illustrating an example of the display of the detailed information of posted information.

When the posted information illustrated in (D) of FIG. 7 is selected on the in-vehicle device 50, the information editing unit 33 transmits the detailed information of the posted information illustrated in FIG. 8 to the in-vehicle device 50, and the display control unit 53 of the in-vehicle device 50 displays the detailed information of the received posted information on the display panel 52. FIG. 8 illustrates an example of the display of the detailed information of the posted information.

Specifically, as illustrated in FIG. 8, the information editing unit 33 acquires, for example, moving picture data or voice data in the posted information selected from FIG. 7 from the memory 25 and transmits the acquired data to the in-vehicle device 50. The display control unit 53 of the in-vehicle device 50 displays the received previous image data on the display panel 52. In the screen illustrated in FIG. 8, for example, the category of the selected posted information, image data added to the posted information, information about the user who posts the information, and the distance from the current position are displayed as the detailed information.

When "x" illustrated in FIG. 8 is selected on the in-vehicle device 50, the information editing unit 33 closes the displayed detailed screen to return to the screen illustrated in FIG. 7. When "G" illustrated in FIG. 8 is selected on the in-vehicle device 50, the information editing unit 33 sequentially generates the detailed information of other posted information items in the vicinity of the displayed posted information and transmits the detailed information to the in-vehicle device 50. When the communication device 20 or the in-vehicle device 50 has a car navigation function and "GO" is selected on the screen illustrated in FIG. 8, the geographical location data of the posted information as transmit to navigation function, then starts route guidance to the displayed posted information.

Figure 9:
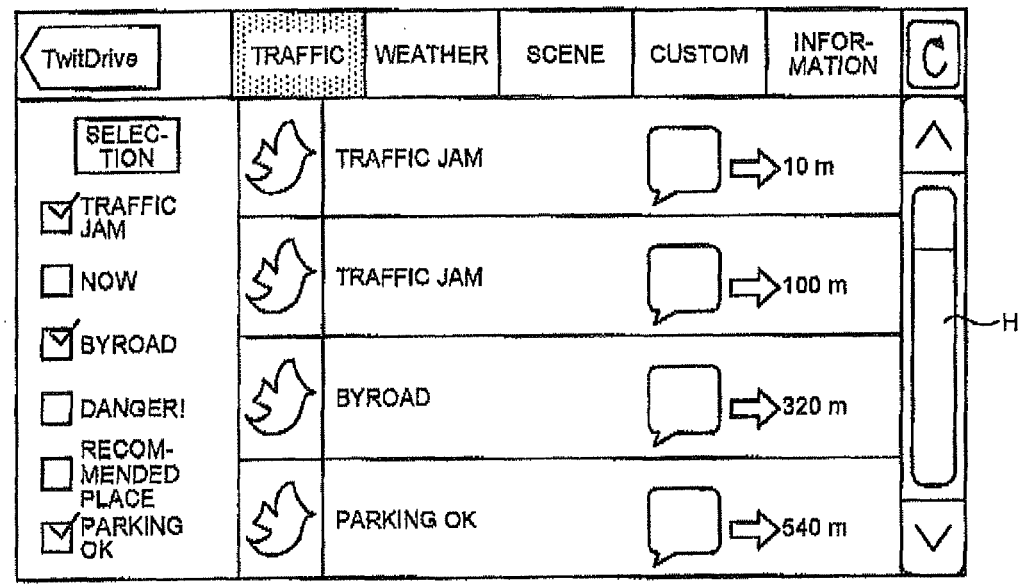
FIG. 9 is a diagram illustrating an example of the display of a list of posted information items.

Returning to FIG. 7, when (E) of FIG. 7 is selected on the in-vehicle device 50, the information editing unit 33 transmits a list of the posted information items displayed on the current map data to the in-vehicle device 50, and the display control unit 53 of the in-vehicle device 50 displays the list of the received posted information items on the display panel 52. FIG. 9 illustrates an example of the display of the list of the posted information items.

Specifically, as illustrated in FIG. 9, the information editing unit 33 classifies the posted information items displayed on the current map data into the categories "traffic, weather, scene, custom, and information" illustrated in FIG. 3 and generates screen data with tags capable of selecting the categories. In the screen illustrated in FIG. 9, tags capable of selecting the categories are provided and a list of the posted information items belonging to the category of a selected tag is displayed. In the list of the posted information items, the distance of the position of each posted information item from the current position also displayed. In addition, operation buttons capable of selecting the posted information are displayed for each category. In FIG. 9, since items "traffic jam, byroad, and parking OK" are selected in the category "traffic," a list of only the items is displayed. In addition, when (H) of FIG. 9 is selected, the information editing unit 33 scrolls the displayed list in the selected direction.

Figure 10:
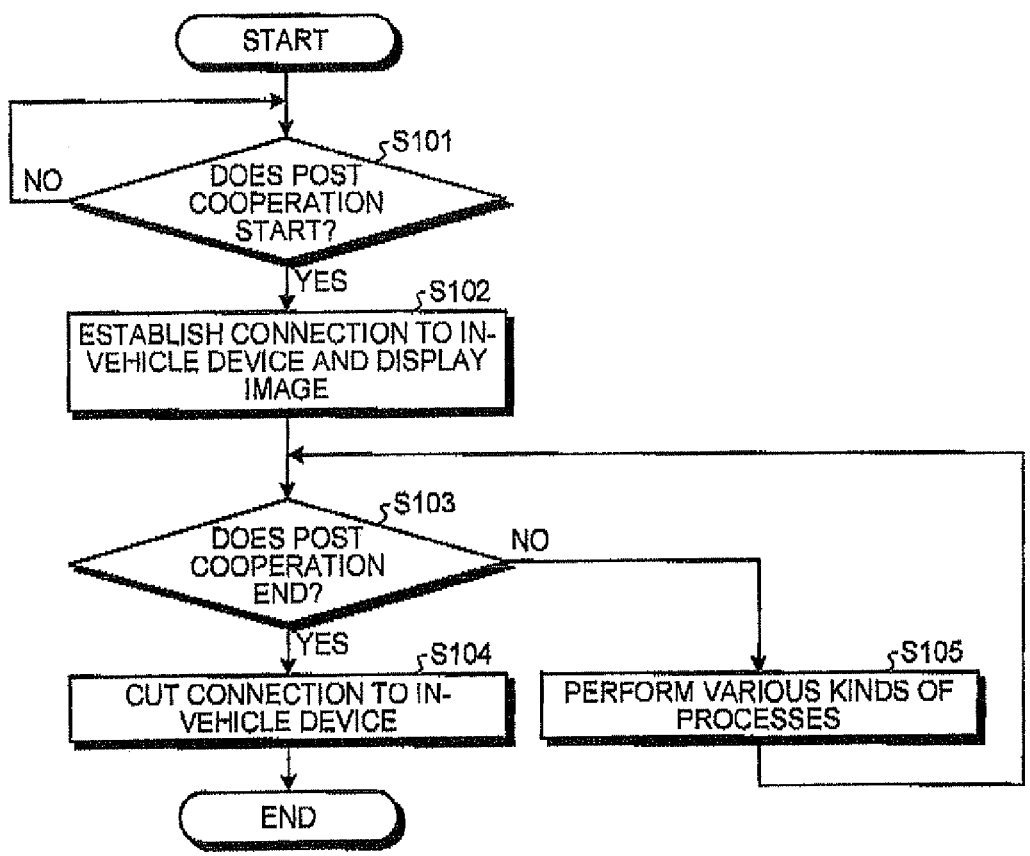
FIG. 10 is a flowchart illustrating the flow of a post cooperation start process of the communication device.
Figure 11:
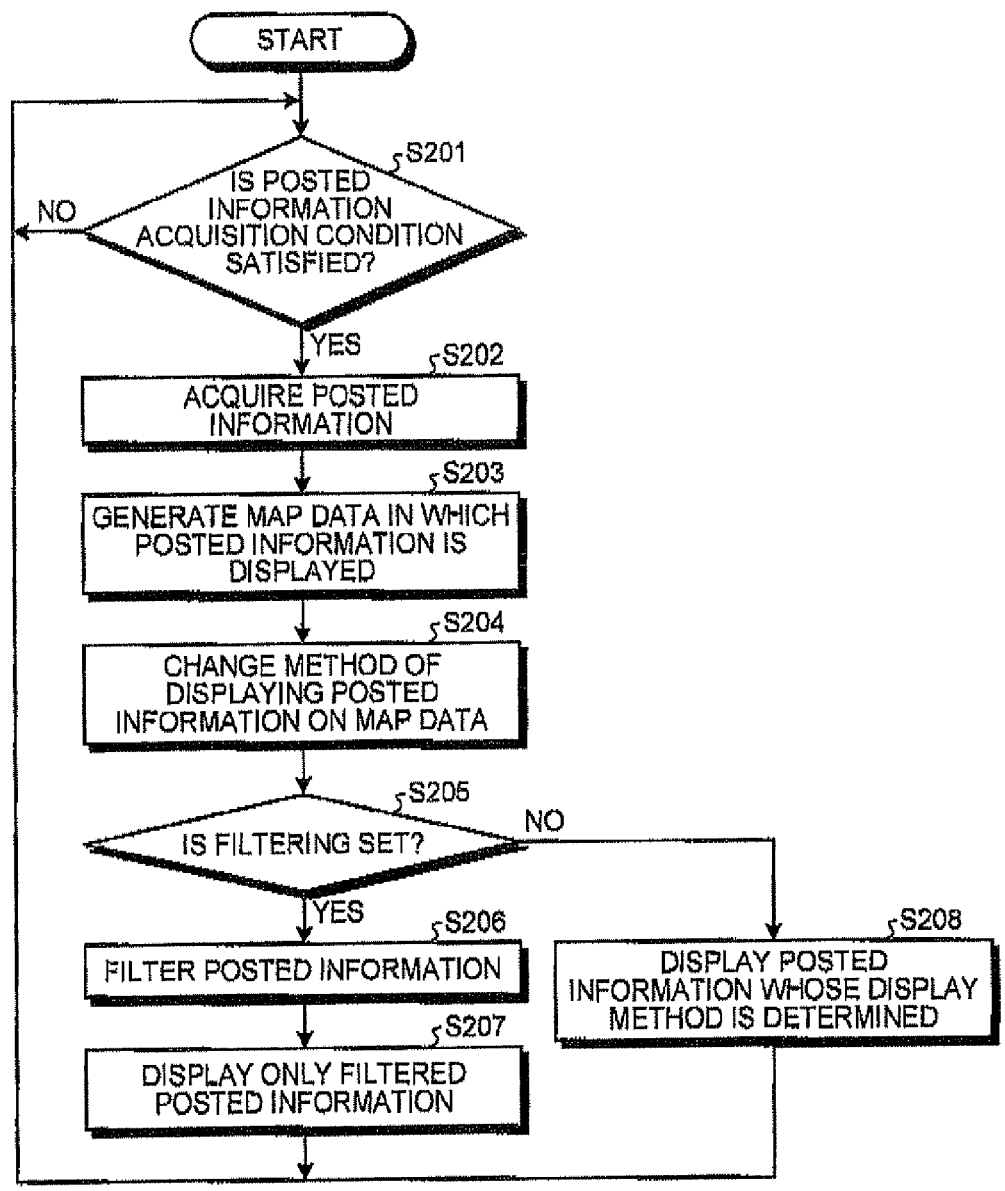
FIG. 11 is a flowchart illustrating the flow of a posted information display process of the communication device.
Figure 12:
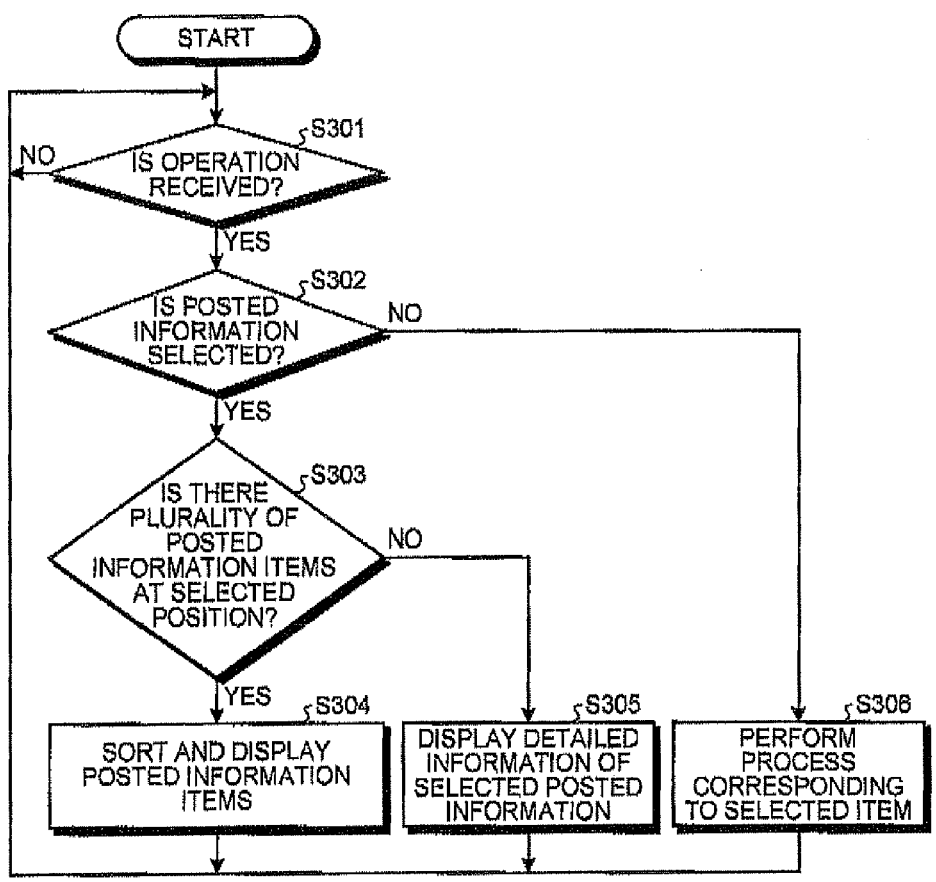
FIG. 12 is a flowchart illustrating the flow of a posted information selecting process of the communication device.

Next, the flow of the process of the in-vehicle display apparatus will be described with reference to FIGS. 10 to 12. FIG. 10 is a flowchart illustrating the flow of a post cooperation start process of the communication device. FIG. 11 is a flowchart illustrating the flow of a posted information display process of the communication device. FIG. 12 is a flowchart illustrating the flow of a posted information selecting process of the communication device.

As illustrated in FIG. 10, when it is detected that the input/output interface 21 and the in-vehicle device 50 are connected to each other by for example, a USE and post cooperation starts (Yes in Step S101), the post cooperation start unit 28 establishes connection to the in-vehicle device 50 (Step S102).

Then, when the operation specifying unit 32 specifies that a post cooperation end operation is performed on the in-vehicle device 50 (Yes in Step S103), the post cooperation start unit 28 cuts communication with the in-vehicle device 50 and ends the process (Step S104).

Until the operation specifying unit 32 specifies that the post cooperation end operation is performed on the in-vehicle device 50 (No in Step S103), the post cooperation start unit 28 performs various kinds of processes described with reference to FIG. 11 or FIG. 12 (Step S105).

As illustrated in FIG. 11, when a posted information acquisition condition is satisfied (Yes in Step S201), the posted information acquiring unit 29 acquires desired posted information from the Twitter server 1 (Step S202).

Then, the map generating unit 30 generates map data in which the posted information is displayed at the position specified by the geographical location data that is acquired together with the posted information by the posted information acquiring unit 29 (Step S203). In this case, the map generating unit 30 may store, in another DB, posted information having "*-arc (* is not particularly limited)" as the "tag" in the posted information stored in the memory 25.

Then, the display changing unit 31 changes the display of the posted information on the map data generated by the map generating unit 30 according to the display method determined on the basis of the elapsed time and the category of the posted information (Step S204).

When filtering for specifying the posted information to be displayed is set (Yes in Step S205), the display changing unit 31 filters the posted information displayed on the map data (Step S206). Then, the display changing unit 31 generates new map data in which only the filtered posted information is displayed and transmits the new map data to the in-vehicle device 50. Then, the map data is displayed on the display panel 52 of the in-vehicle device 50 (Step S207).

On the other hand, when the filtering is not set (No in Step S205), the display changing unit 31 performs Step S208. That is, the display changing unit 31 generates map data in which the posted information whose display method has been determined in Step S204 is displayed and transmits the map data to the in-vehicle device 50. Then, the map data is displayed on the display panel 52 of the in-vehicle device 50. After Step S207 or Step S208, the process returns to Step S201, and Step S201 and the subsequent steps are performed.

As illustrated in FIG. 12, when the user operation received by the in-vehicle device 50 is specified by the operation specifying unit 32 (Yes in Step S301), the information editing unit 33 determines whether the specified operation is for selecting posted information (Step S302).

Then, when the specified operation is for selecting posted information (Yes in Step S302), the information editing unit 33 determines whether there is a plurality of posted information items at the selected position (Step S303).

When there is a plurality of posted information items at the selected position (Yes in Step S303), the information editing unit 33 generates image data in which the plurality of posted information items is sorted and displays the image to the in-vehicle device 50 (Step S304). For example, as illustrated in FIG. 8, the information editing unit 33 displays the detailed information of one posted information item so as to be scrolled. In addition, as illustrated in FIG. 9, the information editing unit 33 sorts the posted information items displayed on the current map data into the categories "traffic, weather, scene, custom, and information" illustrated in FIG. 3, provides tags capable of selecting the categories, and displays the tags.

On the other hand, when a plurality of posted information items is not present at the selected position (Non in Step S303), the information editing unit 33 generates image data in which the detailed information of only a selected posted information item is displayed and displays the image data on the in-vehicle device 50 (Step S305).

In Step S302, when the specified operation is not for selecting posted information (No in Step S302), the information editing unit 33 performs a process corresponding to the selected process (Step S306). For example, as described with reference to FIG. 7, the information editing unit 33 returns to the previous screen, enlarges/reduces the screen, or returns to the main menu. After Step S304, Step S305, and Step S306, the information editing unit 33 returns to Step S301 and performs Step S301 and the subsequent steps.

As such, according to the first embodiment, it is possible to change the display method of posted information, such as Twitter posted in real time, on the basis of the "category" and the "elapsed time" and display the posted information on the map data. Therefore, it is possible to know the content of the posted information displayed on the in-vehicle device 50 at a glance, without hindering safe driving.

In addition, it is possible to arrange information required for real-time processing and information that is desired to be archived and change a method of presenting information to the user according to the specification of information. For example, the color or shape of an icon (speech bubble) indicating the information required for real-time processing may be changed over time and the information may be finally deleted. As a result, it is possible to collect information that is desired by the user in real time and provide useful information without a complicated operation.

In addition, it is possible to provide a nice drive, pleasantness, and a sense of security that the driver is connected to someone and support safe driving with the real-time acquisition of information, while paying attention to "easy transmission of information in real time," which is a characteristic of Twitter (registered trademark).

The communication device 20 according to this embodiment may change the "display method" in various ways, in addition to the change of the "display method" based on the "category" and the "elapsed time" described in the first embodiment.

For example, the display changing unit 31 may change the display method on the basis of the number of posted information items displayed at each position on the map data generated by the map generating unit 30. For example, the display changing unit 31 determines whether the number of posted information items displayed at a predetermined position (for example, oo 1-chore) on the map data generated by the map generating unit 30 is equal to or more than a predetermined value (for example, 10). When the number of posted information items is equal to or more than the predetermined value, the display changing unit 31 does not display all of the posted information items at the position, but may display, for example, a large icon indicating "posted information=10." As a result, the user can know a spot where a large amount of information is posted at a glance.

In addition, the display changing unit 31 may determine whether the number of posted information items displayed within a radius of 1 km from a predetermined position on the map data generated by the map generating unit 30 is equal to or more than a predetermined value (for example, 10). That is, the display changing unit 31 can change the display method according to the number of posted information items in a given region as well as the number of posted information items at a given spot.

For example, the display changing unit 31 may change the display method on the basis of the number of times the posted information is continuously displayed on the map data which is previously generated by the map generating unit 30. For example, the display changing unit 31 compares the map data previously transmitted to the in-vehicle device 50 with the map data that is being currently transmitted to the in-vehicle device 50 and determines whether there is a spot where the posted information is continuously displayed a predetermined number of times. When there is a spot where the posted information is continuously displayed a predetermined number of times, the display changing unit 31 thickens the frame of the posted information at the spot on the currently generated map data or displays the number of times the posted information is continuously displayed. As a result, the user can know the spot where the posted information is continuously displayed at a glance.

For example, the display changing unit 31 may change the display method on the basis of a response to the posted information displayed on the map data which is generated by the map generating unit 30. For example, when Twitter (registered trademark) is used as posted information, the number of times the posted information is read and the number of times a response to the posted information is transmitted may be counted. The display changing unit 31 counts the number of times the posted information on the map data transmitted to the in-vehicle device 50 is read or the number of times a response to the posted information is transmitted. Then, when the number of times the posted information is read is equal to or more than a predetermined value or when the number of times a response to the posted information is transmitted is equal to or more than a predetermined value, the display changing unit 31 changes the display method of the posted information such that the posted information is flickered or thickened and the user knows the state of the posted information at a glance. As a result, the user can know the posted information that other users are interested in at a glance.

For example, the display changing unit 31 may change the display method on the basis of, for example, the position of the vehicle provided with the in-vehicle display apparatus, the current time, the current weather, the current season, and profiles indicating various kinds of information related to the driver of the vehicle. For example, when the position of the vehicle is "Kyushu," the display changing unit 31 may not display the posted information related to other districts or the posted information that is less relevant to the current position of the vehicle, such as "snow." When the current time is "(6:00-12:00) a.m.," the display changing unit 31 may not display posted information that is not matched with the "morning" such as a beautiful evening glow. When the current weather is "shine," the display changing unit 31 does not display unnecessary posted information, such as "shine," but may display posted weather information, such as "rain," different from the current weather.

When the current season is "summer," the display changing unit 31 may not display the posted information that is less relevant to "summer," such as "very heavy snowfall" or "autumn leaves." The display changing unit 31 may display only the posted information identical to profiles indicating, for example, the hobby of the user and a designated category. Each of the posted information items may be determined by the content of the posted information.

In addition, for example, when Twitter (registered trademark) is used as the posted information, the display changing unit 31 may display the posted information of a user who is followed by the user or the user's posted information so as to be discriminated from other information items. For example, the posted information of a user who is followed by the user or the user's posted information may be displayed as a thick frame and other posted information items may be displayed as a thin frame.

In the first embodiment, the in-vehicle display apparatus does not have map data, but the invention is not limited thereto. The in-vehicle display apparatus may have map data. In a third embodiment, an example in which the in-vehicle display apparatus has map data will be described.

Figure 13:
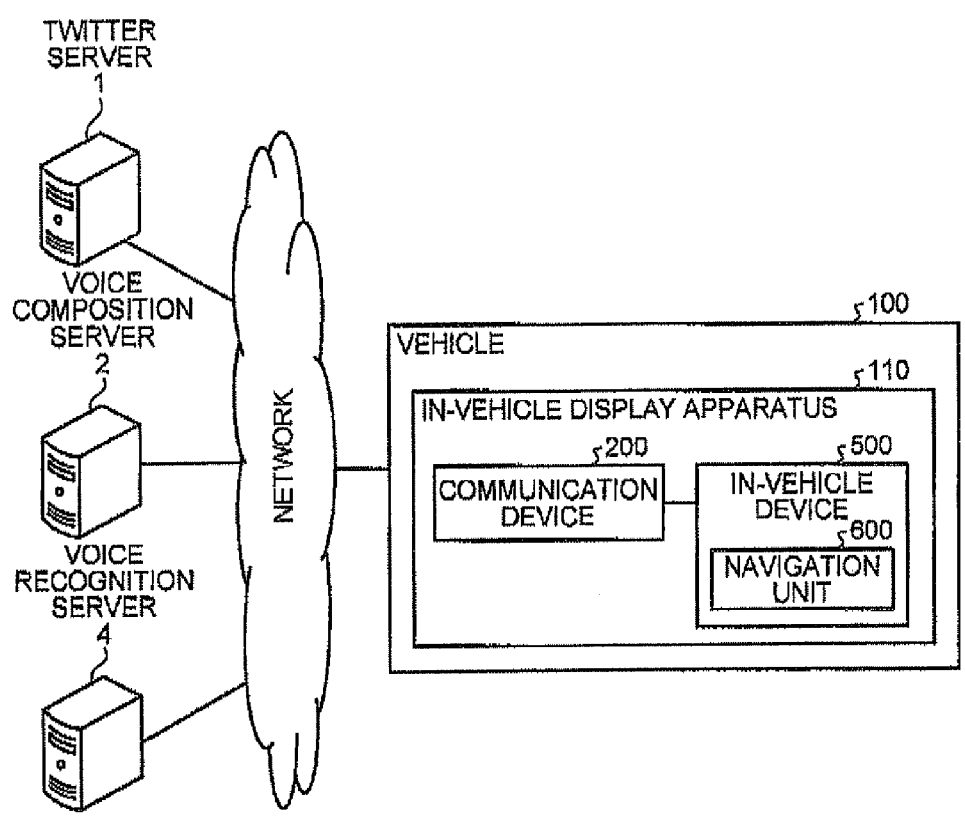
FIG. 13 is a diagram illustrating the overall structure of a system including an in-vehicle display apparatus according to a third embodiment.

FIG. 13 is a diagram illustrating the overall structure of a system including an in-vehicle display apparatus according to the third embodiment. As illustrated in FIG. 13, the system includes a Twitter server 1, a voice composition server 2, a voice recognition server 4, and an in-vehicle display apparatus 110 that is provided in a vehicle 100 such as a car. The Twitter server 1, the voice composition server 2, and the voice recognition server 4 have the same functions as those according to the first embodiment and thus a detailed description thereof will be omitted.

The in-vehicle display apparatus 110 is provided in the vehicle 100 and includes a communication device 200 and an in-vehicle device 500. In the in-vehicle display apparatus 110, the communication device 200 and the in-vehicle device 500 are provided in different housings, but the invention is not limited thereto. For example, the communication device 200 and the in-vehicle device 500 may be provided in a housing.

Similar to the communication device 20 according to the first embodiment, the communication device 200 is, for example, a mobile phone, a personal computer, or a smart phone that can be connected to the Web or the Internet and is connected to the in-vehicle device 500 by, for example, wireless communication or a USB. The communication device 200 outputs, for example, posted information and voice data to the in-vehicle device 50 and performs various kinds of processes according to the content of the operation of the user through, for example, a touch panel of the in-vehicle device 500.

Various kinds of functions of the communication device 200, such as a function of acquiring posted information, a post cooperation function, an information edition function, and an operation specifying function, are the same as those of the communication device 20 illustrated in FIG. 2 and thus a detailed description thereof will be omitted. In particular, the communication device 200 differs from the communication device 20 according to the first embodiment in that the map data to which posted information is added is acquired from the in-vehicle device 500, not the map server 3. The communication device 200 may acquire the coordinates of the operation position of the user from the in-vehicle device 500 and specify the content of the operation using the acquired coordinates. The communication device 200 may acquire the latitude and longitude of the operation position of the user from the in-vehicle device 500 and specify the content of the operation using the acquired latitude and longitude.

The communication device 200 may transmit posted information and geographical location data to the in-vehicle device 500, and the in-vehicle device 500 may specify the posted position from the geographical location data and display the posted information on the specified map data.

The in-vehicle device 500 includes a liquid crystal monitor, such as a touch panel or a display, and has basic functions, such as a display function, an audio reproducing function, and a communication function with a portable terminal. The third embodiment differs from the first embodiment in that the in-vehicle device 500 includes a navigation unit 600. That is the in-vehicle device 500 according to the third embodiment has map data and a route guidance function.

The functions of the in-vehicle device 500, such as a display control function, a command control function, and a voice control function, are the same as those of the in-vehicle device 50 illustrated in FIG. 2 and a detailed description thereof will be omitted. In particular, the navigation unit 600 of the in-vehicle device 500 that is not provided in the in-vehicle device 50 according to the first embodiment has map data stored in a storage medium, such as a Digital Versatile Disc (DVD) or a Hard Disk Drive (HDD). When a destination is input, the navigation unit 600 can display a traveling route from the current position to the destination on the display panel.

When receiving a user operation input to the display panel, the navigation unit 600 transmits the coordinates or the latitude and longitude indicating the operation position to the communication device 200. In addition, the navigation unit 600 transmits map data in which a desired position is displayed to the communication device 200 in response to a request from the communication device 200 and displays image data received from the communication device 200 on the display panel. When receiving the posted information and the posted position from the communication device 200, the navigation unit 600 may add the posted information to the posted position to generate map data.

When the posted information on the map data displayed on the display panel is selected, the navigation unit 600 may guide a route to the selected posted information as the destination.

The in-vehicle display apparatuses according to the embodiments of the invention have been described above, but the invention is not limited to the above-described embodiments. The invention can be applied to various embodiments. Next, other embodiments will be described.

In the above-described embodiments, the communication device 20 generates the map data in which the vehicle is disposed at the center, but the invention is not limited thereto. The vehicle may be disposed at any position on the map data. In this case, for example, a "button" capable of checking the position of the vehicle may be displayed on the map data.

For example, in the above-described embodiments, the category "custom" may be used as information shared only between the followers of Twitter (registered trademark), that is, between other users designated by the user. In this case, when a plurality of vehicles is driven, the posted information can be exchanged only between the users who drive the vehicles. In this way, it is possible to prevent the posted information from a designated user being buried with the posted information from other users.

The setting of the archive conditions according to the first embodiment can be arbitrarily changed. Therefore, for example, it is possible to archive the posted information to be deleted, and when the user wants to semipermanently store the posted information, the user can archive individually designated posted information. In addition, it is possible to arbitrarily change the setting of various kinds of conditions stored in, for example, the category DB in addition to the archive conditions.

For example, when the number of posted information items displayed on the map data is equal to or more than a predetermined value, the communication device 20 changes the threshold value of the elapsed time which is determined to be displayed on the map data such that the number of posted information items displayed on the map data is less than the predetermined value. For example, when the posted information in which the "elapsed time" is "within 12 hours" is displayed on the map data, the number of posted information items displayed on the map data is equal to or more than a predetermined value (for example, 50). In this case, the communication device 20 may change the threshold value of the elapsed time such that only the posted information in which the "elapsed time" is "within 6 hours" is displayed. In addition, the communication device 20 may dynamically change the "elapsed time" to be displayed such that the number of posted information items displayed on the map data is less than a predetermined value (for example, 50).

For example, when the communication device 20 or the in-vehicle device 50 has an application capable of performing navigation and posted information on the map data displayed by the communication device 20 is selected, it is possible to navigate a traveling route from the current position of the vehicle to the selected posted information for the driver of the vehicle.

For example, voice recognition may be performed by the operation specifying unit 32 using the microphone 24 of the communication device 20 or the microphone 57 of the in-vehicle device 50. That is, either the communication device 20 or the in-vehicle device 50 may receive voice signals. In this case, as described above, voice recognition is also performed using the voice recognition server 4. In addition, when the communication device 20 or the in-vehicle device 50 has a voice recognition engine (application), the in-vehicle display apparatus 11 may perform voice recognition, without using the voice recognition server 4.

The functional concept of the components of each apparatus is illustrated in the drawings, but the components are not necessarily physically configured as illustrated in the drawings. For example, the detailed example of the distribution and integration of the components is not limited to the above. All or some of the components may be functionally or physically distributed or integrated in any unit according to various kinds of loads or use conditions. All or some of the processing functions of each component may be implemented by a processor, such as a CPU, and programs that are analyzed and executed by the processor, or they may be implemented as hardware by a wired logic.

For example, in the above-described embodiments, the in-vehicle display apparatus 11 includes the communication device 20 and the in-vehicle device 50, but the invention is not limited thereto. For example, the in-vehicle device 50 may have the function of the communication device 20.

The posted information cooperation method according to this embodiment may be implemented by executing a program that is prepared in advance with a computer, such as a personal computer or a workstation. The program may be distributed through a network, such as the Internet. In addition, the program may be recorded on a computer-readable recording medium, such as a hard disk, a flexible disk (FD), a CD-ROM, an MO, or a DVD. Then, the program may be read from the recording medium by the computer and then executed.

In this way, it is possible to know the content of the posted information displayed on the in-vehicle device at a glance without hindering safe driving.

As described above, the in-vehicle display apparatus and the display method according to the embodiment of the invention are useful to display information posted by the user and are particularly suitable to know the content of the posted information displayed on the in-vehicle device at a glance without hindering safe driving.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle display apparatus that is provided in a vehicle, the in-vehicle display apparatus comprising:
   an information acquiring unit (1) that sends requests of posted information to a server storing information which is posted by a plurality of users in real time, (2) that acquires the posted information from the server, and (3) that acquires geographical location data indicating the destination of the posted information;
   a display unit that displays the posted information acquired by the information acquiring unit using a display method that is changed based on an elapsed time from the posting of the information to the acquisition of the posted information by the information acquiring unit, the posted information being displayed at a position of map data based on the geographical location data acquired by the information acquiring unit, wherein
   the display unit displays the acquired posted information using a speech bubble-type icon when the elapsed time from the posting of the information to the acquisition of the posted information that is acquired by the information acquiring unit is less than a predetermined time and displays the acquired posted information using a non-speech bubble-type icon when the elapsed time from the posting of the information to the acquisition of the posted information that is acquired by the information acquiring unit is equal to or greater than the predetermined time.

2. The in-vehicle display apparatus according to claim 1, wherein the display unit changes the display method on the basis of a number of posted information items displayed at the position of map data and displays the posted information that is acquired by the information acquiring unit.

3. The in-vehicle display apparatus according to claim 1, wherein the display unit changes the display method on the basis of a response to the posted information displayed at the position of map data and displays the posted information that is acquired by the information acquiring unit.

4. The in-vehicle display apparatus according to claim 1, wherein the display unit:
   changes the display method on the basis of at least one of geographical location data of the vehicle, current time information, current weather information, current season information, and a profile related to a driver of the vehicle; and
   displays the posted information that is acquired by the information acquiring unit.

5. The in-vehicle display apparatus according to claim 1, wherein, when a number of posted information items displayed on the map data is equal to or more than a predetermined value, the display unit changes a threshold value of an elapsed time to be displayed on the map data such that the number of posted information items displayed on the map data is less than the predetermined value, and displays the posted information that is acquired by the information acquiring unit.

6. The in-vehicle display apparatus according to claim 1, further comprising:
   a route presenting unit,
   wherein the posted information is displayed on the display unit so as to be selectable, and
   wherein, when the posted information is selected on the map data displayed by the display unit, the route presenting unit presents a traveling route from a current position of the vehicle to the selected posted information.

7. A display method that displays information posted to a server storing information which is posted by a plurality of users in real time on a display apparatus, the display method comprising:
sending, by an information acquiring unit, requests of the posted information to the server;
acquiring, by the information acquiring unit, the posted information and geographical location data indicating the destination of the posted information from the server;
generating a map data in which the posted information is displayed at a position specified by the geographical location data which is acquired together with the posted information; and
changing a method of displaying the posted information based on an elapsed time that indicates time elapsed from the posting of the information to the acquisition of the posted information by the information acquiring unit,
wherein the changing includes displaying the acquired posted information using a speech bubble-type icon when the elapsed time from the posting of the information to the acquisition of the posted information that is acquired by the information acquiring unit is less than a predetermined time and displaying the acquired posted information using a non-speech bubble-type icon when the elapsed time from the posting of the information to the acquisition of the posted information that is acquired by the information acquiring unit is equal to or greater than the predetermined time.

* * * * *